United States Patent
Piesker

(10) Patent No.: US 7,992,821 B2
(45) Date of Patent: Aug. 9, 2011

(54) ARRANGEMENT AND METHOD FOR INSTALLING A COMPONENT IN AN AIRCRAFT

(75) Inventor: Markus Piesker, Lüneburg (DE)

(73) Assignee: Airbus Deutschland GmbH, Hamburg (DE)

( * ) Notice: Subject to any disclaimer, the term of this patent is extended or adjusted under 35 U.S.C. 154(b) by 476 days.

(21) Appl. No.: 11/946,080

(22) Filed: Nov. 28, 2007

(65) Prior Publication Data

US 2008/0135682 A1    Jun. 12, 2008

Related U.S. Application Data

(60) Provisional application No. 60/869,124, filed on Dec. 8, 2006.

(30) Foreign Application Priority Data

Dec. 8, 2006 (DE) .................... 10 2006 058 006

(51) Int. Cl.
*B64C 1/06* (2006.01)

(52) U.S. Cl. ......... 244/131; 244/1 R; 248/613; 248/557; 248/638

(58) Field of Classification Search .............. 244/118.6, 244/122 R, 131, 1 R; 248/557, 611, 613, 248/615, 638
See application file for complete search history.

(56) References Cited

U.S. PATENT DOCUMENTS

| | | | |
|---|---|---|---|
| 6,260,813 B1 * | 7/2001 | Whitcomb | 248/503.1 |
| 7,410,127 B1 * | 8/2008 | Ahad | 244/118.5 |
| 7,703,291 B2 * | 4/2010 | Bushnik et al. | 62/3.2 |
| 2003/0209632 A1 | 11/2003 | Hessling | |
| 2006/0086886 A1 | 4/2006 | Humfeldt et al. | |

FOREIGN PATENT DOCUMENTS

DE    102004042080    3/2006

* cited by examiner

*Primary Examiner* — J. Woodrow Eldred
(74) *Attorney, Agent, or Firm* — Wood, Herron & Evans, LLP

(57) ABSTRACT

An arrangement (10) for installing a component (12) in an aircraft comprises a guide device (14) which is connectable to an aircraft structure or is formed integrally with the aircraft structure, as well as an elastically deformable damping element (16; 16a, 16b, 16c) which is adapted to enable the component (12) to be mounted in the guide device (14) in a self-supporting manner. A locking mechanism (26) is adapted to fasten the component (12) in a desired position in the guide device (14) in a releasable manner.

14 Claims, 2 Drawing Sheets

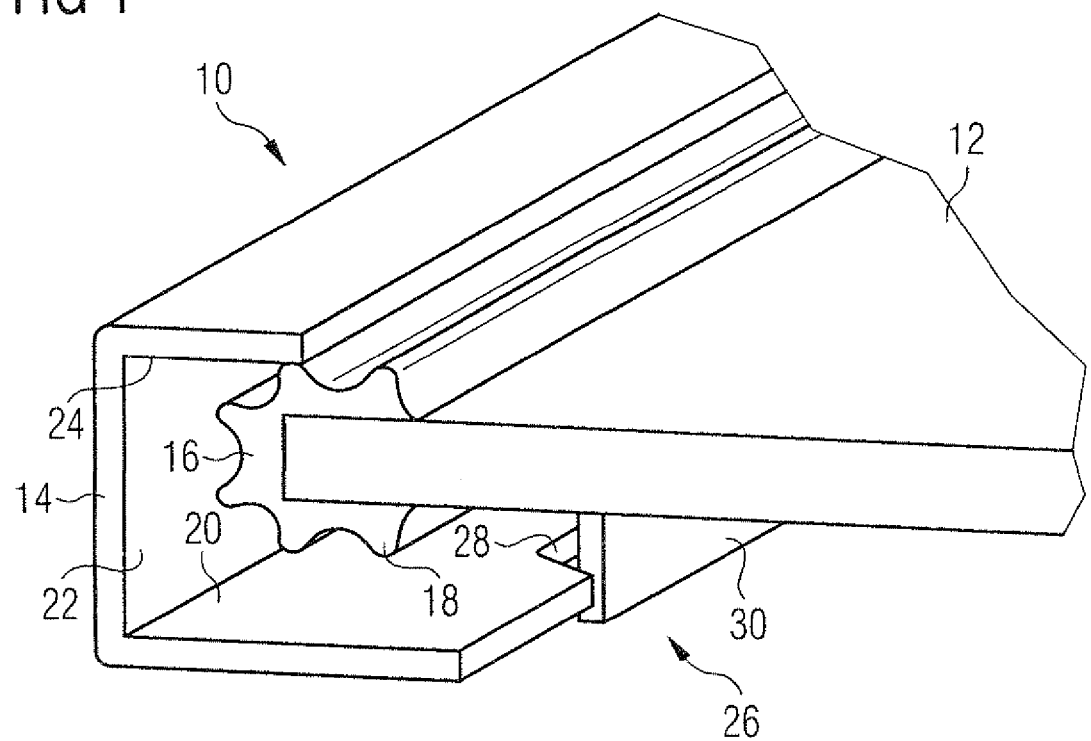

ARRANGEMENT AND METHOD FOR INSTALLING A COMPONENT IN AN AIRCRAFT

TECHNICAL FIELD

The present invention relates to an arrangement and a method for installing a component in an aircraft.

BACKGROUND

When installing components such as, e.g. structural elements, on-board systems or fittings, in an aircraft, it is usually unnecessary to attach the components to a support structure, for example the aircraft structure. However this entails the problems of vibrations of the support structure which occur during flight, for example, being transmitted undamped to the components connected to the support structure. Moreover, additional forces are applied to the components through, for example, deflections of the support structure which likewise occur during flight.

In order to prevent damage to the components in consequence of the vibrations which are transmitted from the support structure as well as the additional forces resulting from deflections of the support structure, the components can be designed so that they can withstand the increased loads acting on them. However, this may increase the weight of the components in a disadvantageous manner. It is alternatively possible to isolate the components from the support structure. However, this frequently entails a considerable constructional expenditure on account of the installation space, which is usually confined on board an aircraft.

The object of the present invention is to provide an arrangement and a method for installing a component in an aircraft which guarantee reliable isolation of the component from a support structure which is subject to vibrations and deflections and at the same time enable the component to be quickly and easily fastened to the support structure.

This object is achieved by an arrangement and a method having the features described below 10.

SUMMARY

The arrangement according to the invention for installing a component in an aircraft comprises a guide device which is connectable to an aircraft structure or is formed integrally with the aircraft structure. The guide device is therefore adapted to be directly in contact with a support structure which is subject to vibrations and/or deflections. For example, the guide device can be connected to a rib or a plurality of ribs of the aircraft structure or be formed integrally therewith, i.e. constitute a part of the aircraft structure. Any desired connecting device which are appropriate for this purpose, such as, for example, screws, nuts or rivets, can be used to connect the guide device to the aircraft structure. It is in addition also conceivable to fasten the guide device to the aircraft structure by means of an adhesive joint or a welded joint.

An elastically deformable damping element of the arrangement according to the invention is adapted to enable the component to be mounted in the guide device in a self-supporting manner. In other words, the damping element is configured so that the component in the installed state is mounted in the guide device via the damping element. Due to the self-supporting mounting of the component in the guide device, which can be achieved by means of the damping element, the component can be reliably isolated from the vibrations and/or deflections which are transmitted from the aircraft structure to the guide device in particular when the aircraft is in flight. It is as a result also possible to accommodate a vulnerable component in the guide device with low stress and vibration levels. If the component serves as a structural element, it can therefore be configured with fewer reinforcements and/or less material and consequently so as to be lighter. In the case of a component formed as an on-board system or a fitting, the loads acting on the component can be significantly reduced by the low-stress and low-vibration mounting and therefore the risk of damage to the component due to vibrations and/or deflections transmitted from the aircraft structure to the guide device can be decreased.

The arrangement according to the invention for installing a component in an aircraft also comprises a locking mechanism which is adapted to fasten the component in a desired position in the guide device in a releasable manner. The locking mechanism enables the component to be easily and quickly installed and removed, so that, for example, maintenance work on the component is rendered considerably easier. The arrangement according to the invention for installing a component in an aircraft is particularly well suited for installing thermal insulating elements in the region of a firewall of the Auxiliary Power Unit (APU) of the aircraft.

The guide device is preferably in the form of a rail into which the component upon installation can be easily and conveniently pushed. The guide device can have a substantially U-shaped profile or a substantially U-shaped cross section, for example. A guide device which is formed in this way enables the component to be positioned and mounted in the guide device particularly easily and securely.

The damping element of the arrangement according to the invention for installing a component in an aircraft preferably consists of fluorosilicone, rubber or a plastics material of an appropriate Shore hardness. It is important for the material of the damping element to be of sufficient elasticity in order to give the damping element the damping properties which are required to ensure that the component mounted in the guide device via the damping element is properly isolated from the vibrations and/or deflections which are transmitted from the aircraft structure to the guide device.

The damping element can be fastened to the guide device or the component. This makes it easier to install the component in the guide device. Generally speaking, the arrangement according to the invention for installing a component in an aircraft can comprise just one damping element which, for example, can be configured so that it embraces an edge of the component and therefore enables the component to be mounted in the guide device in a self-supporting manner. However, the arrangement according to the invention can alternatively also comprise a plurality of damping elements which are disposed at appropriate positions between the component and the guide element and thereby ensure that the component is mounted in the guide device in a self-supporting manner. For example, it is conceivable to provide three damping elements which support the component in the guide device at two surfaces lying opposite one another as well as at an end face adjacent to the surfaces lying opposite one another.

The locking mechanism of the arrangement according to the invention for installing a component in an aircraft preferably comprises a locking element which is fastened to the component and/or a locking element which is fastened to the damping element. The locking element consists, for example, of sheet metal or a plastics material.

The locking mechanism of the arrangement according to the invention for installing a component in an aircraft can also comprise a recess which is formed in the guide device. The form and the size of the locking element which is fastened to the component are preferably adapted to the form and the size of the recess which is formed in the guide device. The locking element for fastening the component in the guide device can consequently interact with the recess which is formed in the guide device. The locking mechanism therefore enables the component to be fastened in the guide device in a simple, yet secure, releasable manner.

In a preferred embodiment of the arrangement according to the invention for installing a component in an aircraft the locking mechanism comprises a plurality of recesses which are formed in the guide device, so that the component can be fastened in various positions in the guide device by means of the locking element fastened to the component. Moreover, the provision of a plurality of recesses formed in the guide device enables a plurality of components to be fastened in one and the same guide device. This makes it possible to use a single guide device to install a plurality of components in the aircraft in a particularly efficient manner.

The damping element of the arrangement according to the invention for installing a component in an aircraft is preferably of an appropriate geometry and/or Shore hardness in order to hold the locking mechanism in its locked position through the restoring forces which it applies to the component. The restoring forces of the damping element in particular hold the locking element fastened to the component in engagement with the recess which is formed in the guide device. A damping element of an appropriate geometry and/or Shore hardness can therefore perform the dual function of enabling the component to be mounted in the guide device in a self-supporting manner and at the same time holding the locking mechanism of the arrangement according to the invention in its locked state through the restoring forces which are applied to the component. The geometry and/or the Shore hardness of the damping element can be adapted according to the geometry and the weight of the component and according to the constructional configuration of the locking mechanism in order to ensure that the locking mechanism is securely locked when the component is in the installed state in the guide device.

The locking mechanism can alternatively or additionally comprise a resiliently formed locking element. The locking element fastened to the component can then act as a detent element which, when the component is positioned in the guide device, deforms resiliently and, for example, interlocks with a complementary detent element formed at the guide device when the component has reached the desired position in the guide device. The recess which is formed in the guide device can serve as the complementary detent element. However, a differently formed complementary detent element can also be provided at the guide device to interact with a resilient locking element of the locking mechanism.

The guide device, the damping element and/or the locking mechanism of the arrangement according to the invention for installing a component in an aircraft preferably consist(s) of electrically non-conductive materials. There is no need to earth the component, e.g. for protection against a stroke of lightning, when the arrangement according to the invention is configured in this way.

Depending on the geometry and the weight of the component which is to be installed, only one installation arrangement described above may be sufficient to securely install the component in the desired position in the aircraft. However, if required, a plurality of installation arrangements according to the invention can also be used to install a single component in the aircraft. For example, it is conceivable to fasten a plate-shaped component at the desired position in the aircraft by means of two installation arrangements lying opposite one another. In an arrangement of this kind the component can, for example, be supported in two guide devices lying opposite one another along two edges lying opposite one another via a respective damping element or a plurality of damping elements and in this way be mounted in the guide devices lying opposite one another in a self-supporting manner.

A method according to the invention for installing a component in an aircraft comprises the steps of providing a guide device which is connectable to an aircraft structure or is formed integrally with the aircraft structure, as well as providing an elastically deformable damping element. The component is positioned in the guide device such that the component is mounted in the guide device in a self-supporting manner via the elastically deformable damping element. Finally, the component is fastened in a desired position in the guide device in a releasable manner by a locking mechanism.

The damping element is preferably fastened to the guide device or the component before the component is positioned in the guide device. For example, the damping element can be stuck to the guide device or the component or form-fitted thereto.

When being positioned in the guide device, the component is preferably displaced in the guide device while the damping element undergoes elastic deformation.

When the component has reached the desired position in the guide device, a locking element, which is fastened to the component, of the locking mechanism preferably interacts with a recess, which is formed in the guide device, of the locking mechanism in order to fasten the component in the guide device in a releasable manner.

In a preferred embodiment of the method according to the invention for installing a component in an aircraft the damping element holds the locking mechanism in its locked position through its restoring forces. The restoring forces of the damping element can in particular hold the locking element which is fastened to the component in engagement with the recess which is formed in the guide device.

The locking mechanism can alternatively or additionally be held in its locked position through the restoring forces of a resiliently formed locking element. The restoring forces of the resiliently formed locking element can in particular hold the locking element which is fastened to the component in engagement with the recess which is formed in the guide device.

BRIEF DESCRIPTION OF THE DRAWINGS

Preferred embodiments of the arrangement according to the invention as well as the method according to the invention for installing a component in an aircraft are now illustrated in detail on the basis of the accompanying, schematic drawings, of which:

FIG. 1 shows a first embodiment of an arrangement according to the invention for installing a component in an aircraft.

DETAILED DESCRIPTION

Figure 2A:
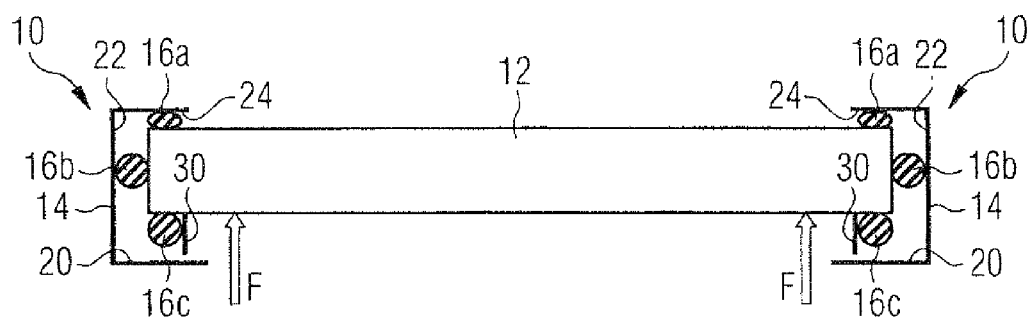
FIG. 2a shows a second embodiment of an arrangement according to the invention for installing a component in an aircraft in which the locking mechanism is in a position in which it is not locked.

FIG. 1 shows a first embodiment of an arrangement 10 for installing a component 12 in an aircraft. The arrangement 10 comprises a guide device 14 which is in the form of a rail and has a substantially U-shaped cross section. The guide device 14 is connected to an aircraft structure, which is not shown in FIG. 1, so that vibrations and/or deflections of the aircraft structure occurring in particular during flight are transmitted to the guide device 14.

The arrangement 10 also comprises an elastically deformable damping element 16 which consists of an elastically deformable material such as, e.g. fluorosilicone or rubber. The damping element 16 has a substantially U-shaped cross section, i.e. it is shaped so that it embraces an edge of the plate-shaped component 12. The damping element 16 is stuck to the component 12 and at its outer circumference has a plurality of projections 18 which are supported at inner faces 20, 22, 24 of the guide device 14. The damping element 16 therefore enables the component 12 to be mounted in the guide device 14 in a self-supporting manner.

Due to the self-supporting mounting of the component 12 in the guide device 14, the component 12 is reliably isolated from vibrations and/or deflections which are transmitted from the aircraft structure to the guide devices 14. The component 12 is therefore mounted in the guide device 14 with low stress and vibration levels via the damping element 16.

The installation arrangement 10 also comprises a locking mechanism 26 in order to fasten the component 12 in a desired position in the guide device 14. The locking mechanism 26 is formed by a recess 28 which is formed in the guide device 14 as well as a locking element 30 which is fastened to the component 12. The form and the size of the locking element 30 are adapted to the form and the size of the recess 28 which is formed in the guide device 14. The component 12 is securely fixed in its position in the guide device 14 through the interaction of the locking element 30 with the recess 28 which is formed in the guide device 14. The locking element 30 is in this case held in engagement with the recess 28 which is formed in the guide device 14 through the restoring forces of the elastically deformable damping element 16.

The guide device 14, the damping element 16 and/or the locking mechanism 30 each consist of electrically non-conductive materials. There is as a result no need to earth the component 12, for example for protection against a stroke of lightning.

Figure 2B:
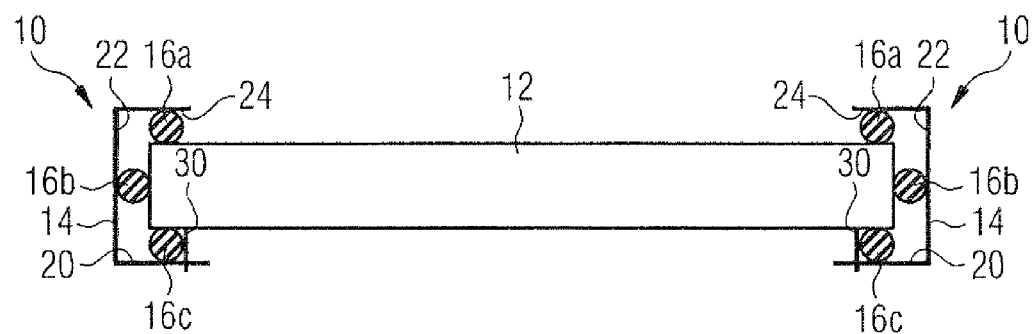
FIG. 2b shows the second embodiment of the arrangement according to the invention for installing a component in an aircraft in which the locking mechanism is in a locked position.

The arrangement 10 which is shown in FIGS. 2a and 2b for installing a component 12 in an aircraft differs from the arrangement which is represented in FIG. 1 in that it comprises three damping elements 16a, 16b, 16c instead of a single damping element 16 embracing the edge of the component 12. The damping elements 16a, 16b and 16c support two surfaces of the component 12 which lie opposite one another as well as an end face, adjacent to the two surfaces lying opposite one another, of the component 12 at the inner faces 20, 22, 24 of the guide device 14. In other respects the structure of the arrangement 10 which is shown in FIGS. 2a and 2b corresponds to the structure of the arrangement which is represented in FIG. 1.

The installation of the component 12 in an aircraft by means of the installation arrangement 10 is illustrated in the following. When installing the component 12, the damping element 16 or the damping elements 16a, 16b, 16c is/are firstly fastened to the component 12 in a first step. The damping element 16 or the damping elements 16a, 16b, 16c can be stuck to the component 12, for example.

The component 12 with the damping element 16 fastened thereto or the damping elements 16a, 16b, 16c fastened thereto is then pushed into the guide device 14, with the damping element 16 or 16a being compressed by the force F, which is illustrated by arrows in FIG. 2a, such that the locking element 30 fastened to the component 12 does not come into contact with the guide device 14.

Only when the component 12 has reached the desired position in the guide device 14 and the force F no longer acts on the component 12 does the damping element 16 or 16a return to its original form and the locking element 30 fastened to the component 12 engage with the recess 28 formed in the guide device 14. The damping element 16 or 16a holds the locking element 30 in engagement with the recess 28 formed in the guide device 14 through its elastic restoring forces.

The invention claimed is:

1. Arrangement for installing a component in an aircraft having an aircraft structure, the component having at least two opposing outwardly-directed surfaces and an end surface residing therebetween, the arrangement comprising:
   a guide device coupled to the aircraft structure, the wide device including at least two opposing sides with inwardly-directed surfaces;
   an elastically deformable damping element coupled to the component along the at least two opposing outwardly-directed surfaces and at the end surface thereof;
   the damping element being sufficiently deformable to enable insertion of the component into the guide device between the at least two inwardly-directed surfaces thereof; and
   the damping element also configured such that, when the component is inserted into the guide device, the damping element contacts and is supported by the inwardly-directed surfaces of the at least two opposing sides of the guide device, thereby to mount the component in the guide device in a self-supporting manner and isolate the component from vibrations or deflections of the aircraft transmitted from the aircraft structure to the guide device.

2. Arrangement according to claim 1, wherein the guide device comprises a rail with a substantially U-shaped profile defining an inner end surface adjacent to the at least two inwardly-directed surfaces, and wherein the damping element also contacts and is supported by the inner end surface when the component is inserted into the guide device.

3. Arrangement according to claim 1, wherein the damping element comprises fluorosilicone or rubber.

4. Arrangement according to claim 1, further comprising:
   a locking mechanism which releasably fastens the component to the guide device in a desired position.

5. Arrangement according to claim 4, wherein the locking mechanism comprises a locking element fastened to the component.

6. Arrangement according to claim 5, wherein the locking mechanism comprises a recess which is formed in the guide device for receiving the locking element.

7. Arrangement according to claim 5, wherein the locking element is resiliently formed.

8. Arrangement according to claim 4, wherein the guide device, the damping element, and the locking mechanism are each formed from electrically non-conductive materials.

9. Method for installing a component in an aircraft having an aircraft structure, the component having at least two opposing outwardly-directed surfaces and an end surface residing therebetween, the method comprising:
   providing a guide device coupled to the aircraft structure, the guide device including at least two opposing inwardly-directed surfaces,
   coupling an elastically deformable damping element to the component along the at least two opposing outwardly-directed surfaces and also at the end surface thereof, elastically deforming the damping element to position the component in the guide device such that the coupled damping element engages and is supported by the at least two opposing inwardly-directed surfaces of the guide device, thereby to mount the component in the guide device in a self-supporting manner and with the component isolated from vibrations or deflections of the aircraft transmitted from the aircraft structure to the guide device.

10. Method according to claim 9, further comprising;
fastening the component in a desired position in the guide device in a releasable manner with a locking mechanism.

11. Method according to claim 9, wherein when being positioned in the guide device, the component is displaced in the guide device while the damping element undergoes elastic deformation.

12. Method according to claim 10, wherein the locking mechanism includes a locking element which is fastened to the component and interacts with a recess formed in the guide device in order to fasten the component in the guide device in a releasable manner.

13. Method according to claim 10, wherein the locking mechanism holds the component in a desired position through the restoring forces of the damping element.

14. Method according to claim 10, wherein the locking mechanism holds the component in a desired position through the restoring forces of a resiliently formed locking element.

* * * * *